United States Patent [19]

Bossard

[11] 4,262,168
[45] Apr. 14, 1981

[54] SPLIT SEALING WASHER

[75] Inventor: Ronald G. Bossard, St. Paul, Minn.

[73] Assignee: Minnesota Mining and Manufacturing Company, St. Paul, Minn.

[21] Appl. No.: 58,449

[22] Filed: Jul. 18, 1979

[51] Int. Cl.³ .......................................... H02G 15/013
[52] U.S. Cl. .................................... 174/77 R; 174/92; 277/63; 277/96.1; 277/167.5; 277/217; 277/221
[58] Field of Search .................. 174/77 R, 93, 92; 277/63, 96.1, 216, 217, 219, 221, 167.5

[56] References Cited

U.S. PATENT DOCUMENTS

| 2,771,502 | 11/1956 | King et al. | 174/92 |
| 2,788,385 | 4/1957 | Doering et al. | 174/77 R X |

Primary Examiner—Roy N. Envall, Jr.
Attorney, Agent, or Firm—Cruzan Alexander; Donald M. Sell; James V. Lilly

[57] ABSTRACT

A composite washer is comprised of two identical flexible mating half-washers each offset along a diameter and slit along an offset radius. Two half-washers are mated after being slipped over a cable section to provide a fluid-resistant barrier in a cable splice enclosure.

7 Claims, 3 Drawing Figures

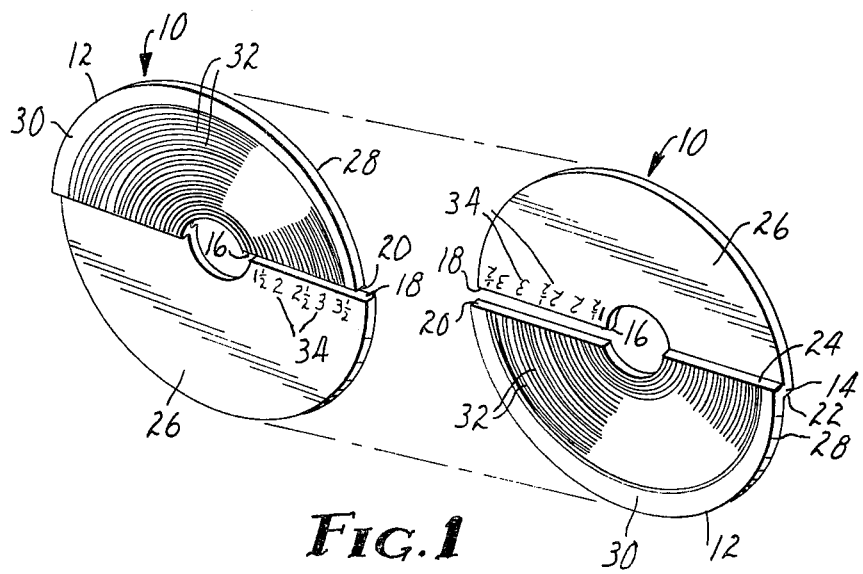
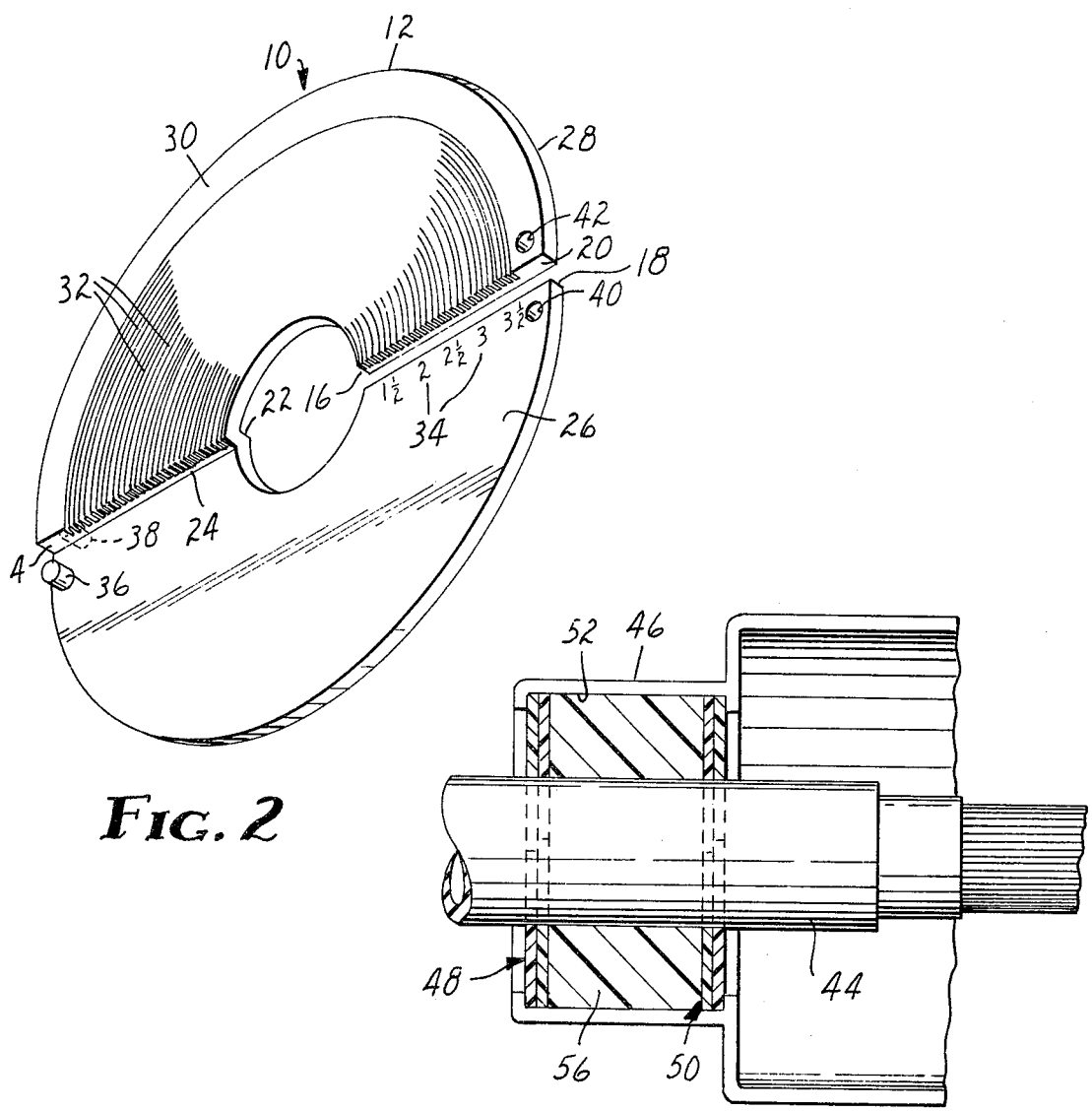

SPLIT SEALING WASHER

This invention relates to structural elements in washer-like or annulus form and which are useful in the sealing of cable splice enclosures.

U.S. Pat. No. 2,771,502 illustrates one form of splice enclosure in which split washers are employed in compressing resilient annular bushings inwardly against the enclosed cable and outwardly against the cylindrical case or shell to provide a tight seal. In the form illustrated in FIGS. 17-20 of the patent, the washers are made in two rigid generally U-shaped halves which slide together about the cable or cables. Each is restricted to use with a cable or cables of specified diameter.

The washers of the present invention are likewise constructed of two halves, but each half is an essentially complete annulus. Each half is radially slotted and is elastically deformable to permit application to a continuous cable. The two halves mate together to provide a deformation-resistant composite which fits closely around the cable and within the case, and may be easily adjusted to fit cables of different diameters. The resulting structure is sufficiently leak-resistant to permit the use of mastic or self-hardening liquid sealants without significant loss thereof, as required in forming a gas-tight junction in the cable.

In the drawing,

FIG. 1 is a view in perspective showing two half-washers separated and in position for mating, FIG. 2 is a view in perspective showing a half-washer with optional retaining means, and FIG. 3 is a partial view illustrating an application of the washers in a splice enclosure seal.

The two half-washers 10 of FIG. 1 may be seen to be identical. Each may be described as a centrally perforate thin flat disc 12 one half of which has been offset along a diameter by the thickness of the disc, forming a connecting shoulder 14 which has been removed along one radius. The two inner faces 26, 28 of the arcuate mutually offset interconnected segments are coplanar. The narrow radial slot 16 formed by removal of the connecting shoulder permits mating of two half-washers, e.g. by sliding them together from the positions indicated in the Figure. The parallel edges 18, 20 defining the slot 16 of the one then fit against the surfaces 22, 24 respectively, of the shoulder 14 of the other. The coplanar or inner faces 26, 28 of the one fit against the corresponding faces 28, 26 respectively of the other. The composite washer is of uniform thickness.

Semicircular grooves 32 in the outer faces 30 and indicia 34 on inner faces 26 serve as guides for removal of stock to increase the internal diameter of the annulus where required for cables of different diameter. The grooves 32 in the illustrated embodiment extend into the outer faces 30 about one-half of the thickness of the half-washer.

FIG. 2 illustrates another optional modification. Bosses 36, 38 formed on faces 26, 28 respectively plug into diametrically opposite holes 40, 42 respectively with an interference fit, locking the two half-washers securely together and avoiding flaring or other possible displacement.

Application of the washers as sealing members in a cable splice case is indicated in FIG. 3. The two sets of half-washers, previously selected or with inner diameter enlarged as needed to fit the cable diameter, are first slipped over the cable 44 by a twisting action, the relative thinness and springiness of the members permitting the required elastic deformation. The opposing half-washers are slid onto the cable from opposite directions to mate them as they are slipped over the cable. They may alternatively be applied from a common direction and then rotated together. If the half-washers are provided with bosses and apertures as in FIG. 2, they are then pressed and locked together. A mastic sealant 56 in tape form is wrapped around the cable between the assembled washers 48, 50. The cable is then laid in the lower half case 46 with the assembled washers 48, 50 at the ends of the sealing chamber 52 of case 46 against the inwardly extending flanged ends of the centrally open end walls, and the upper half of the case (not shown) is fitted over the assembly and secured in place. The washers effectively retain the mastic under the pressure applied, while being capable of bulging slightly to accept any slight excess of mastic which may be present. In place of the mastic 56, a self-hardening sealant may be injected between the washers after closing the case.

The half-washers of this invention are preferably produced of thermoplastic molding resin by injection molding procedures.

I claim:

1. A thin elastic half-washer capable of mating with another identical half-washer to form a rigidified leak-resistant barrier in a cable splice enclosure, comprising a thin flat elastic annulus the two halves of which have been offset the thickness of said annulus along a diameter with formation of a connecting shoulder, said shoulder being removed along a radius to provide a radial slot, the inner faces of said two halves being coplanar.

2. Article of claim 1 wherein at least the outer face of one of said halves carries semicircular grooves serving as guides for stock removal in increasing the inner diameter of said annulus.

3. Article of claim 1 wherein said two halves are provided with apertures and on the inner faces with bosses diametrically opposite said apertures and of a diameter to provide a force fit in said apertures, for locking two mating half-washers together.

4. A composite of two half-washers each individually comprising a thin flat elastic annulus, the two halves of which have been offset the thickness of said annulus along a diameter with formation of a connecting shoulder, said shoulder being removed along a radius to provide a radial slot, the inner faces of said two halves being coplanar; wherein said two half-washers are in mating engagement with the radial edges defining said radial slot of one contacting the opposing faces of the connecting shoulder of the other and with the coplanar inner faces of the two half-washers in contact.

5. Composite of claim 4 wherein the two halves of each are provided with apertures and on the inner faces with bosses diametrically opposite said apertures and of a diameter to provide a force fit in said apertures for locking said two half washers together, the bosses of the one being force fit into the apertures of the other.

6. In a cable splice enclosure, a seal comprising a sealing chamber having inwardly flanged open end walls, a cable passing through said chamber, washer composites individually comprising a thin flat elastic annulus, the two halves of which have been offset the thickness of said annulus along a diameter with formation of a connecting shoulder, said shoulder being removed along a radius to provide a radial slot, the inner faces of said two halves being coplanar; said composites being around said cable and within each of said ends and supported against the flanges thereof, and a mastic sealant collar compressed between said washer composites within the chamber and around said cable.

7. In a cable splice enclosure, a seal comprising a sealing chamber having inwardly flanged open end walls, a cable passing through said chamber, washer composites individually comprising a thin flat elastic annulus, the two halves of which (i) have been offset the thickness of said annulus along a diameter with formation of a connecting shoulder, said shoulder being removed along a radius to provide a radial slot, the inner faces of said two halves being coplanar; and (ii) are provided with apertures and on the inner faces with bosses diametrically opposite said apertures and of a diameter to provide a force fit in said apertures for locking two mating half-washers together; said composites being around said cable and within each of said ends and supported against the flanges thereof, and a mastic sealant collar compressed between said washer composites within the chamber and around said cable.

* * * * *